United States Patent
Lee et al.

(10) Patent No.: US 9,573,456 B2
(45) Date of Patent: Feb. 21, 2017

(54) POWER TRANSMISSION APPARATUS FOR VEHICLE

(71) Applicant: Hyundai Motor Company, Seoul (KR)

(72) Inventors: KyeongHun Lee, Seoul (KR); Sueng Ho Lee, Seoul (KR); JongSool Park, Hwaseong-si (KR); Seong Wook Hwang, Gunpo-si (KR); Minjun Song, Gunpo-si (KR); Byung Hyun Lee, Gunpo-si (KR); Jong Min Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/866,274

(22) Filed: Sep. 25, 2015

(65) Prior Publication Data

US 2016/0167503 A1 Jun. 16, 2016

(30) Foreign Application Priority Data

Dec. 15, 2014 (KR) .................. 10-2014-0180674

(51) Int. Cl.
*B60K 6/365* (2007.10)
*F16H 3/00* (2006.01)
(Continued)

(52) U.S. Cl.
CPC .............. *B60K 6/365* (2013.01); *B60K 6/485* (2013.01); *B60K 6/543* (2013.01); *B60K 6/547* (2013.01); *F16H 3/006* (2013.01); *F16H 37/042* (2013.01); *F16H 37/065* (2013.01); *F16H 2003/0931* (2013.01);
(Continued)

(58) Field of Classification Search
None
See application file for complete search history.

(56) References Cited

U.S. PATENT DOCUMENTS

| | | | | |
|---|---|---|---|---|
| 2012/0021861 A1* | 1/2012 | Sakai | ............ | B60K 6/365 475/5 |
| 2012/0115674 A1* | 5/2012 | Ikegami | ............ | B60K 6/36 477/3 |

(Continued)

FOREIGN PATENT DOCUMENTS

| | | |
|---|---|---|
| JP | 2013-148130 A | 8/2013 |
| JP | 2013-185613 A | 9/2013 |

(Continued)

*Primary Examiner* — Justin Holmes
(74) *Attorney, Agent, or Firm* — Morgan, Lewis & Bockius LLP

(57) ABSTRACT

A power transmission apparatus for a vehicle may include a first input shaft selectively connected to an output side of an internal combustion engine through a first clutch, a second input shaft disposed at the first input shaft without any rotational interference and selectively connected to the output side of the internal combustion engine through a second clutch, a motor/generator performing a function of a motor and a generator, and a planetary gear set including first, second, and third rotation elements such that the first rotation element is directly connected with the motor/generator, the second rotation element is selectively connected with the second input shaft so as to be in synchronization with each other, and the third rotation element is directly connected with the first input shaft.

20 Claims, 2 Drawing Sheets

(51) Int. Cl.
*F16H 37/04* (2006.01)
*F16H 37/06* (2006.01)
*B60K 6/543* (2007.10)
*B60K 6/547* (2007.10)
*B60K 6/485* (2007.10)
*F16H 3/093* (2006.01)

(52) U.S. Cl.
CPC ............... *F16H 2200/0043* (2013.01); *F16H 2200/2005* (2013.01); *Y10S 903/91* (2013.01); *Y10S 903/918* (2013.01); *Y10S 903/919* (2013.01)

(56) References Cited

U.S. PATENT DOCUMENTS

| | | | |
|---|---|---|---|
| 2012/0322603 A1* | 12/2012 | Kuroda | ............... B60K 6/48 475/5 |
| 2013/0096761 A1* | 4/2013 | Kuroda | ............... B60K 6/48 701/22 |

FOREIGN PATENT DOCUMENTS

| | | |
|---|---|---|
| JP | 5312242 B2 | 10/2013 |
| KR | 10-2014-01331 12 | 11/2014 |

\* cited by examiner

FIG. 2

| Shifting gear position | CL1 | CL2 | SL1 D1 | SL1 D4 | SL2 D2 | SL3 D3 | SL4 | SL5 | Note |
|---|---|---|---|---|---|---|---|---|---|
| Neutral | | | ● | | | | | | |
| Neutral (BATT charge) | ● | | ● | | | | | | BATT charge |
| First forward speed | (A) | ● | ● | | | | ● | (B) | Fixed gear ratio mode (DCT mode) - Engine driving - Motor assist - Regenerative braking |
| Second forward speed | (A) | ● | | | ● | | (●) | (B) | |
| Third forward speed | (A) | ● | | | | ● | ● | (B) | |
| Fourth forward speed | (A) | ● | | ● | | | (●) | (B) | |
| HEV first speed | ● | | ● | | | | | | Variable gear ratio mode (e-CVT mode) - e-CVT driving |
| HEV second speed | ● | | | | ● | | ● | | |
| HEV third speed | ● | | | ● | | | | | |
| HEV fourth speed | ● | | | | | ● | ● | | |
| EV first speed | | | ● | | | | | ● | Fixed gear ratio mode (DCT mode) - EV driving - Regenerative braking |
| EV second speed | | | | | ● | | | ● | |
| EV third speed | | | | | | ● | ● | ● | |
| EV fourth speed | | | | ● | | | ● | ● | |
| EV reverse speed | | | ● | | | | | ● | |

● : Connection
(A)(●) : Connection for Motor Assist
(B)(●) : Connection for Regenerative Braking

POWER TRANSMISSION APPARATUS FOR VEHICLE

CROSS-REFERENCE TO RELATED APPLICATION

The present application claims priority to Korean Patent Application No. 10-2014-0180674 filed Dec. 15, 2014, the entire contents of which is incorporated herein for all purposes by this reference.

BACKGROUND OF THE INVENTION

Field of the Invention

The present invention relates to a power transmission apparatus for a vehicle. More particularly, the present invention relates to a power transmission apparatus for a vehicle which can improve power delivery efficiency through a fixed gear ratio mode and control to an optimal driving point through a variable gear ratio mode by applying a motor/generator and a planetary gear set for an electronic continuous variable transmission (E-CVT) to a double clutch transmission (DCT).

Description of Related Art

In a vehicle, environment-friendly technology is a key on which the survival of the future automobile industry may greatly depend, so vehicle manufacturers are devoting their efforts to the development of environment-friendly vehicles so as to meet required environmental and fuel efficiency regulations.

As such a future type of vehicle technology, there are, for example, an electric vehicle (EV) which uses electrical energy, a hybrid electric vehicle (HEV), and a double clutch transmission (DCT) which is configured to enhance efficiency and convenience.

In addition, vehicle manufacturers are trying to commercialize a predetermined technology such as an idle stop and go (ISG) device and a regenerative braking device, as a means for enhancing the efficiency of a driving force transfer system in an effort to enhance the performance of fuel efficiency while meeting exhaust gas regulations of each country.

The ISG device uses a technology for stopping the engine while the vehicle stops and for starting the engine when the vehicle starts. The regenerative braking device uses a technology for driving a generator which uses the kinetic energy of the vehicle instead of braking based on a conventional way of friction when braking and decelerating the vehicle, and for storing the generated electrical energy in a battery and then reusing such stored electrical energy.

In addition, the hybrid electric vehicle to which the transmission of the present invention may be applied is a vehicle which uses two or more power sources, and may be combined in various ways. The hybrid electric vehicle may be formed as a hybrid type of a gasoline engine or a diesel engine which uses existing fossil fuel and a motor/generator which is driven by electrical energy.

In addition, as a transmission which may be applied to such a hybrid electric vehicle, there is, for example, a double clutch transmission (DCT). The DCT is capable of increasing efficiency and improving convenience by applying two clutches to the manual transmission structure.

Specifically, the DCT is a transmission wherein gear shifting is performed in such a way that odd-numbered gears and even-numbered gears are alternately operated using two clutches. The mechanism wherein the gear shifting of the odd-numbered gears and the even-numbered gears is alternately performed may improve a torque disconnection effect during the gear shifting of the existing manual transmission (MT) and the automated manual transmission (AMT).

However, the DCT may have a lot of clutch damage and energy loss due to slipping of the clutch at the time of startup. When the vehicle starts on an incline, the vehicle may have a large backward force due to the slipping of the clutch, and thus problems may occur in terms of safety. Since it needs to make shifting quickly due to the heat capacity of the clutch, the impact during the gear shifting increases as compared with the automated transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of being configured to improve power delivery efficiency through a fixed gear ratio mode and to control at an optimal driving point through a variable gear ratio mode by adding a motor/generator and a planetary gear set for an electronic continuous variable transmission (E-CVT) to a double clutch transmission (DCT) and realizing smooth mode variation between a fixed gear ratio mode and a variable gear ratio mode such that power loss is minimized.

In addition, the present invention has been made in an effort to provide a power transmission apparatus for a vehicle having advantages of realizing smooth startup and quick gear shifting and improving fuel consumption by performing regenerative braking and neutral charging.

Furthermore, the present invention has been made in an effort to provide a power transmission apparatus for a vehicle having advantages of safe driving in which gear shifting with an ordinary double clutch transmission is possible when operation of a motor/generator is impossible.

According to various aspects of the present invention, a power transmission apparatus for a vehicle may include a first input shaft selectively connected to an output side of an internal combustion engine through a first clutch, a second input shaft disposed at the first input shaft without any rotational interference and selectively connected to the output side of the internal combustion engine through a second clutch, a motor/generator performing a function of a motor and a generator, and a planetary gear set including first, second, and third rotation elements such that the first rotation element is directly connected with the motor/generator, the second rotation element is selectively connected with the second input shaft so as to be in synchronization with each other, and the third rotation element is directly connected with the first input shaft, in which a variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element, and a fixed gear ratio mode adapted to transmit rotational power of the internal combustion engine through the second input shaft while connecting the planetary gear set with the second input shaft by operating the second clutch, after the second rotation element is connected with the second input shaft so as to be in synchronization with each other while maintaining the operation state of the first clutch in the variable gear ratio mode, may be realized.

The power transmission apparatus may further include a third input shaft disposed in parallel with the second input shaft on the first input shaft without inter-rotational interference so as to be selectively connected to be in synchronization with the second input shaft by one synchronizer, to be selectively connected to be in synchronization with the first rotation element by another synchronizer, and to be directly connected with the second rotation element.

A plurality of input gears may be disposed on the second and third input shafts, and the power transmission apparatus may further include a first shift output mechanism changing a rotating speed of rotational power being input from the input gear on the second and third input shaft and outputting the changed rotating speed, and a second shift output mechanism changing a rotating speed of rotational power being input from the input gear on the second and third input shafts and outputting the changed rotating speed.

The input gear to influence even-numbered shifting gear positions may be disposed at the second input shaft, and the input gear to influence odd-numbered shifting gear positions may be disposed at the third input shaft.

A first input gear for realizing a fourth speed and a second input gear for realizing a second speed may be sequentially disposed from a front side to a rear side on the second input shaft, and a third input gear for realizing a first speed and a fourth input gear for realizing a third speed may be sequentially disposed from a front side to a rear side on the third input shaft.

The first shift output mechanism may include a first output shaft disposed in parallel with the second and third input shafts, a first output gear fixed to and disposed at one end of the first output shaft so as to output rotational power of the first output shaft, a first speed shift gear disposed on the first output shaft so as to be externally engaged with the third input gear, a fourth speed shift gear disposed on the first output shaft so as to be externally engaged with the first input gear, and a first synchronizer selectively connecting the first speed shift gear or fourth speed shift gear to be in synchronization with the first output shaft.

The second shift output mechanism may include a second output shaft disposed in parallel with the second and third input shafts, a second output gear fixed to and disposed at one end of the second output shaft so as to output rotational power of the second output shaft, a second speed shift gear disposed on the second output shaft so as to be externally engaged with the second input gear, a third speed shift gear disposed on the second output shaft so as to be externally engaged with the fourth input gear, a second synchronizer selectively connecting the second speed shift gear to be in synchronization with the second output shaft, and a third synchronizer connecting the third speed shift gear to be in synchronization with the second output shaft.

The one synchronizer may be a fourth synchronizer which selectively connects the third input shaft and the second input shaft to be in synchronization with each other, and the other synchronizer may be a fifth synchronizer which selectively connects the third input shaft and the first rotation element to be in synchronization with each other.

According to various aspects of the present invention, a power transmission apparatus for a vehicle may include a first input shaft selectively connected to an output side of an internal combustion engine through a first clutch, a second input shaft disposed at the first input shaft without any rotational interference and selectively connected to the output side of the internal combustion engine through a second clutch, a third input shaft disposed in parallel with the second input shaft on the first input shaft without inter-rotational interference so as to be selectively connected to be in synchronization with the second input shaft by one synchronizer and to be directly connected with the second rotation element, a motor/generator disposed on the third input shaft so as to function as a motor and a generator, and a planetary gear set including first, second, and third rotation elements such that the first rotation element is directly connected with the motor/generator, the second rotation element is directly connected with the third input shaft, and the third rotation element is directly connected with the first input shaft, in which a variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element to the third input shaft, and a fixed gear ratio mode adapted to transmit rotational power of the internal combustion engine to the second and third input shafts while connecting the planetary gear set with the second input shaft by operating the second clutch, after the third input shaft directly connected with the second rotation element is connected with the second input shaft to be in synchronization by the one synchronizer while maintaining the operation state of the first clutch in the variable gear ratio mode, may be realized.

The third input shaft may be selectively connected to be in synchronization with the first rotation element by another synchronizer.

The one synchronizer may be a fourth synchronizer selectively connecting the third input shaft and the second input shaft with each other and the other synchronizer may be a fifth synchronizer selectively connecting the third input shaft and the first rotation element with each other.

A first input gear for realizing a fourth speed and a second input gear for realizing a second speed may be sequentially disposed from a front side to a rear side on the second input shaft, and a third input gear for realizing a first speed and a fourth input gear for realizing a third speed may be sequentially disposed from a front side to a rear side on the third input shaft, and the power transmission apparatus may further include a first shift output mechanism changing a rotating speed of rotational power being input from the input gear on the second and third input shafts and outputting the changed rotating speed, and a second shift output mechanism changing a rotating speed of rotational power being input from the input gear on the second and third input shafts and outputting the changed rotating speed.

According to various aspects of the present invention, a power transmission apparatus for a vehicle may include a first input shaft selectively connected to an output side of an internal combustion engine, a second input shaft formed as a hollow shaft and disposed at a front side of the first input shaft without any rotational interference so as to be selectively connected to the output side of the internal combustion engine such that a plurality of input gears having a different number of gear teeth are disposed on an exterior circumference thereof, a third input shaft formed as a hollow shaft and disposed at a rear side of the second input shaft on the first input shaft without any rotational interference so as to be selectively connected to be in synchronization with the second input shaft such that a plurality of input gears having the different number of gear teeth are disposed on an exterior circumference thereof, a motor/generator including a stator which is disposed on a rear side of the third input shaft and is fixed to a transmission housing and a rotor which is rotatably supported therein along a radial direction of the stator, a planetary gear set disposed on an external circumference of a rear side of the third input shaft such that a first rotation element thereof is directly connected with the rotor of the motor/generator, a second rotation element thereof is directly connected with a rear end of the third input shaft, and a third rotation element thereof is directly connected with the first input shaft, a first clutch selectively connecting the output side of the internal combustion engine with the first input shaft, a second clutch selectively connecting the output side of the internal combustion engine with the second input shaft, one synchronizer selectively connecting the second input shaft and third input shaft to be in synchronization with each other, another synchronizer selectively connecting the first rotation element and the third input shaft to be in synchronization with each other, a first shift output mechanism changing a rotating speed of rotational power being input from the input gear of the second and third input shafts so as to realize two shifting gear positions for forward speed and then outputting the changed rotational power, and a second shift output mechanism changing a rotating speed of rotational power being input from the input gear of the second and third input shafts so as to realize two shifting gear positions and then outputting the changed rotational power.

A variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element to the third input shaft, and a fixed gear ratio mode adapted to just transmit rotational power of the internal combustion engine to the second and third input shafts while connecting the planetary gear set with the second input shaft by operating the second clutch, after the third input shaft directly connected with the second rotation element is connected with the second input shaft to be in synchronization by the one synchronizer while maintaining the operation state of the first clutch in the variable gear ratio mode, may be realized.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table illustrating gear shifting of an exemplary power transmission apparatus for a vehicle according to the present invention.

Figure 1:
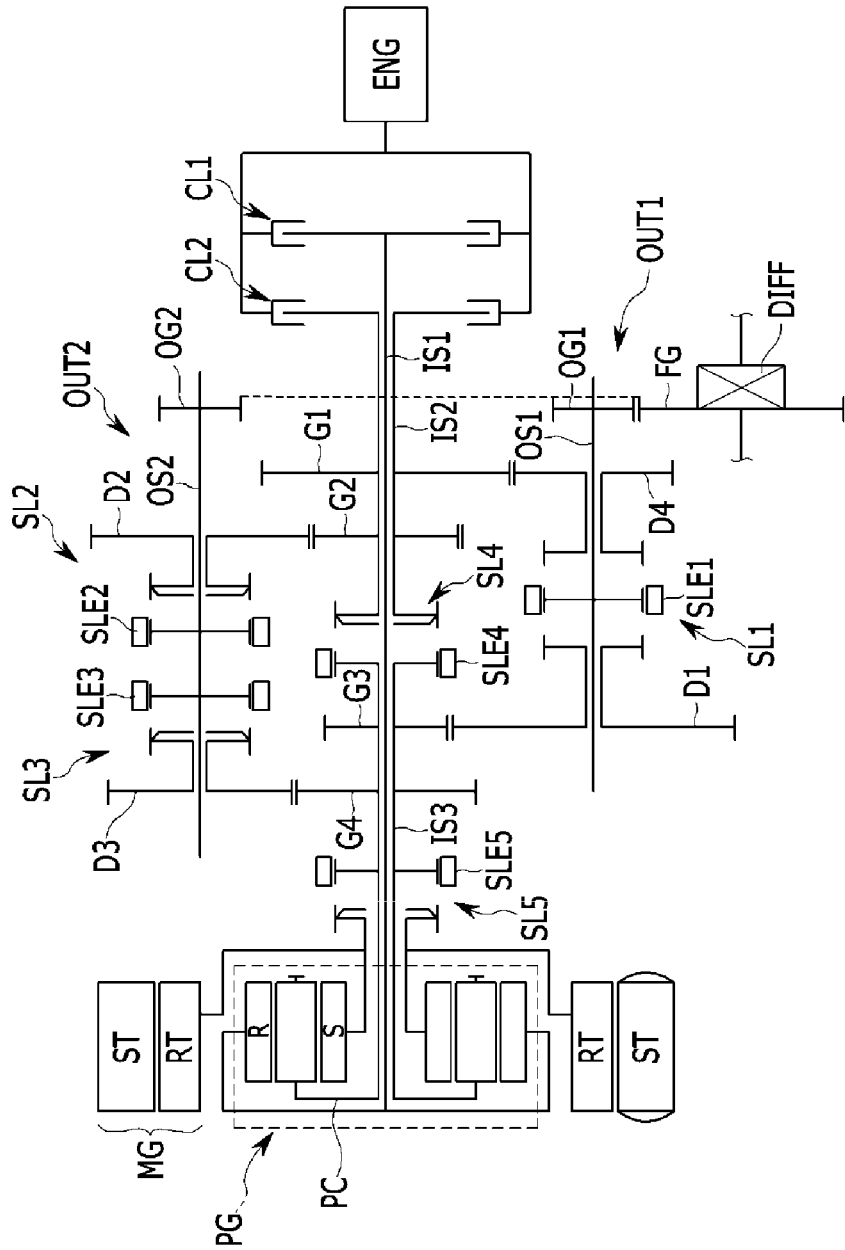
FIG. 1 is a configuration diagram of an exemplary power transmission apparatus for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a configuration diagram of a power transmission apparatus for a vehicle according to an exemplary embodiment of the present invention.

Referring to FIG. 1, the power transmission apparatus according to various embodiments of the present invention includes first, second, and third input shafts IS1, IS2, and IS3, a planetary gear set (PG), a motor/generator (MG), first and second clutches CL1 and CL2, and first and second shift output mechanisms OUT1 and OUT2.

The first input shaft IS1 is selectively connected with an output side of an engine (ENG) which is an internal combustion engine.

The second input shaft IS2 is formed as a hollow shaft and is disposed at an external circumference of the front side of the first input shaft IS1 without inter-rotational interference so as to be selectively connected to the output side of the engine ENG, and first and second input gears G1 and G2 are sequentially disposed from the front side at an external circumference of the second input shaft IS2 apart from each other.

The third input shaft IS3 is formed as a hollow shaft and is disposed at an external circumference of the rear side of the first input shaft IS1 without inter-rotational interference so as to be selectively connected to the second input shaft IS2 to be in synchronization with each other, and third and fourth input gears G3 and G4 are sequentially disposed from the front side at an external circumference of the third input shaft IS3 apart from each other.

The first, second, third, and fourth input gears G1, G2, G3, and G4 are input gears configured for each shifting gear position, so the number of gear teeth is determined such that the first input gear G1 operates as an input gear for a fourth speed, the second input gear G2 operates as an input gear for a second speed, the third input gear G3 operates as an input gear for a first speed, and the fourth input gear G4 operates as input gear for a third speed.

Herein, input gears for odd-numbered shifting gear positions are disposed at the second input shaft IS2, and input gears for even-numbered shifting gear positions are disposed at the third input shaft IS3.

The planetary gear set (PG) is disposed at the rear side of the third input shaft IS3 and is configured to include three rotation elements as first, second, and third rotation elements. The first rotation element is directly connected with the motor/generator (MG), the second rotation element is directly connected with the third input shaft IS3, and the third rotation element is directly connected with the first input shaft IS1.

In various embodiments of the present invention, the planetary gear set (PG) is configured as a single pinion planetary gear set such that the first rotation element is a sun gear S, the second rotation element is a planetary carrier (PC), and the third rotation element is a ring gear (R).

That is, the sun gear (S), which is the first rotation element, is selectively connected with the third input shaft IS3 to be in synchronization with each other in the state of being directly connected with the motor/generator (MG), the planetary carrier (PC), which is the second rotation element, is directly connected with the third input shaft IS3, and the ring gear (R), which is the third rotation element, is directly connected with the first input shaft IS3 in the planetary gear set (PG).

Herein, it is described that the planetary gear set (PG) applies a single pinion planetary gear set which is configured so that the first rotation element is a sun gear (S), the second rotation element is a planetary carrier (PC), and the third rotation element is a ring gear (R) in various embodiments of the present invention, but it is not limited thereto, so below combinations are possible because it is possible for each rotation element to be differently applied according to the operation mechanism of the planetary gear set (PG).

That is, a combination in which the first rotation element is applied to a ring gear (R), the second rotation element is applied to a planetary carrier (PC), and the third rotation element is applied to a sun gear (S), or a combination in which the first rotation element is applied to a ring gear (R), the second rotation element is applied to a sun gear (S), and the third rotation element is applied to a planetary carrier (PC), may be realized.

In addition, a combination in which the first rotation element is applied to a planetary carrier (PC), the second rotation element is applied to a sun gear (S), and the third rotation element is applied to a ring gear (R), a combination in which the first rotation element is applied to a sun gear (S), the second rotation element is applied to a ring gear (R), and the third rotation element is applied to a planetary carrier (PC), or a combination in which the first rotation element is applied to a planetary carrier (PC), the second rotation element is applied to a ring gear (R), and the third rotation element is applied to a sun gear (S), may be realized.

The motor/generator (MG) can perform a function of a motor and a generator, and is disposed at an external circumference of the planetary gear set (PG).

In addition, the motor/generator (MG) includes a stator (ST) which is mounted to a transmission housing and a rotor (RT) which is rotatably supported therein along a radial direction of the stator (ST). As described above, the rotor (RT) is directly connected with the sun gear (S) which is the first rotation element of the planetary gear set (PG).

Thus, the motor/generator (MG) charges electrical energy being generated while functioning as a generator by rotational power of the engine (ENG) to a battery or functions as a motor to make driving torque for vehicle driving.

The first clutch CL1 is disposed between an output side of engine (ENG) and the first input shaft IS1 so as to administer power. The first clutch CL1 may be an ordinary fluid multi-plate clutch and may be controlled to be operated or to not be operated by a hydraulic control system (not shown).

The second clutch CL2 is disposed between the output side of the engine (ENG) and the second input shaft IS2 so as to administer power. The second clutch CL2 may be an ordinary fluid multi-plate clutch and may be controlled to be operated or to not be operated by the hydraulic control system.

One synchronizer for selectively connecting the third input shaft IS3 to be in synchronization with the second input shaft IS2 is provided, and the other synchronizer for selectively connecting the sun gear (S), which is the first rotation element of the planetary gear set (PG), to be in synchronization with the third input shaft IS3 is also provided.

Herein, the one synchronizer is a fourth synchronizer SL4 which is disposed between a rear end of the second input shaft IS2 and a front end of the third input shaft IS3, and functions to selectively connect the second input shaft IS2 to be in synchronization with the third input shaft IS3.

In addition, the other synchronizer is a fifth synchronizer SL5 which selectively connects the sun gear (S) of the planetary gear set (PG) and the rotor (RT) of the motor/generator (MG) to be in synchronization with the third input shaft IS3.

As these fourth and fifth synchronizers SL4 and SL5 are well known to a person skilled in the art, the detailed description is not provided. An extra actuator (not shown) is provided to sleeves SLE4 and SLE5, which are applied to the each synchronizer, and the actuator may be controlled by a transmission control unit.

Herein, the fourth and fifth synchronizers SL3 and SL4 are not limited to synchronizers, and a dog clutch, a fluid multi-plate clutch, and so on in which automatic control is possible may be applied thereto.

The first shift output mechanism OUT1 is configured so that the first output shaft OS1 is disposed apart by a set distance from the second and third input shafts IS2 and IS3 to be parallel with the second and third input shafts IS2 and IS3, and the first output gear OG1 outputting rotational power of the first output shaft OS1 is fixedly disposed at one end of the first output shaft OS1.

A first speed shift gear D1, which is externally engaged with the third input gear G3, and a fourth speed shift gear D4, which is externally engaged with the first input gear G1, are disposed on the first output shaft OS1. A first synchronizer SL1 is provided between the first speed shift gear D1 and the fourth speed shift gear D4 so as to selectively connect the first speed shift gear D1 or the fourth speed shift gear D4 to be in synchronization with the first output shaft OS1.

Thus, the first synchronizer SL1 selectively connects the first speed shift gear D1 and the fourth speed shift gear D4 to be in synchronization with the first output shaft OS1 such that rotational power of the third input gear G3 of the third input shaft IS3 and the first input gear G1 of the second input shaft IS2 are respectively transmitted to the first output shaft OS1 according to each gear ratio being externally engaged.

The rotational power, of which rotating speed is changed through the first shift output mechanism OUT1, is transmitted to a differential gear (DIFF) through a final reduction gear (FG) externally engaged with the first output gear OG1 on the first output shaft OS1.

The second shift output mechanism OUT2 is configured so that the second output shaft OS2 is disposed apart by a set distance from the second and third input shafts IS2 and IS3 to be in parallel with the second and third input shafts IS2 and IS3, and the second output gear OG2 outputting rotational power of the second output shaft OS2 is fixedly disposed at one end of the second output shaft OS2.

A second speed shift gear D2, which is externally engaged with the second input gear G2, and a third speed shift gear D3, which is externally engaged with the fourth input gear G4, are disposed on the second output shaft OS2.

In addition, a second synchronizer SL2 is provided near the second speed shift gear D2 to selectively connect the second speed shift gear D2 to be in synchronization with the second output shaft OS2, and a third synchronizer SL3 is provided near the third speed shift gear D3 to selectively connect the third speed shift gear D3 with the second output shaft OS2.

Thus, the second synchronizer SL2 selectively connects the second speed shift gear D2 to be in synchronization with the second output shaft OS2 such that rotational power of the second input gear G2 of the second input shaft IS2 is transmitted to the second output shaft OS2 according to a gear ratio being externally engaged.

In addition, the third synchronizer SL3 selectively connects the third speed shift gear D3 to be in synchronization with the second output shaft OS2 such that rotational power of the fourth input gear G4 of the third input shaft IS3 is transmitted to the second output shaft OS2 according to a gear ratio being externally engaged.

The rotational power, of which rotating speed is changed through the second shift output mechanism OUT2, is transmitted to the differential gear (DIFF) through the final reduction gear (FG) externally engaged with the second output gear OG2 on the second output shaft OS2.

As this first, second, third synchronizers (SL1-SL3) are well known to a person skilled in the art, the detailed description is not provided. An extra actuator (not shown) is provided to first, second, and third sleeves SLE1, SLE2, and SLE3, which are applied to the first, second, third synchronizers (SL1-SL3), and the actuator may be controlled by a transmission control unit.

FIG. 2 is an operation table illustrating gear shifting of a power transmission apparatus for a vehicle according to various embodiments of the present invention. The gear shifting procedures will be described.

[Neutral]

In a case that neutral is maintained while starting the engine, neutral is maintained in the state that the first speed shift gear D1 and the first output shaft OS1 are connected with each other through the first sleeve SLE1 of the first synchronizer SL1.

[Neutral (Battery Charging)]

In the neutral state, the rotational power of the engine (ENG) is input to the ring gear (R) of the planetary gear set (PG) through the first input shaft IS1 and the planetary carrier (PC) is connected with the first output shaft OS1 which is neutral-stopped through the third input shaft IS3, the third input gear G3, and the first speed shift gear D1 so as to function as a fixed element such that the battery is charged by operating the motor/generator (MG) as the output is performed by the sun gear (S) if the first clutch CL1 is operated.

Hereinafter, a fixed gear ratio mode which is realized when the vehicle is driven by driving the engine (ENG), a variable gear ratio mode which is realized when the vehicle is driven by driving the engine (ENG) and the motor/generator (MG) together, and a fixed gear ratio mode which is realized when the vehicle is driven by driving the motor/generator (MG) according to various embodiments of the present invention will be described.

Firstly, a first forward speed, a second forward speed, a third forward speed, and a fourth forward speed of the fixed gear ratio mode which can assist by the motor/generator (MG) or perform the regenerative braking on the driving state by driving the engine (ENG) will be described.

[First Forward Speed]

The first forward speed is realized by the rotational power of the engine (ENG), and shifting to the first forward speed is performed by connecting the first speed shift gear D1 to be in synchronization with the first output shaft OS1 through the first sleeve SLE1 of the first synchronizer SL1 and operating the second clutch CL2 after connecting the second input shaft IS2 with the third input shaft IS3 through the sleeve SLE4 of the fourth synchronizer SL4.

Thus, driving according to the first forward speed is realized when the rotational power of the engine (ENG) is transmitted to the final reduction gear (FG) via the second clutch CL2, the second input shaft IS2, the fourth synchronizer SL4, the third input shaft IS3, the third input gear G3, the first speed shift gear D1, the first output shaft OS1, and the first output gear OG1.

[Second Forward Speed]

When shifting to the second forward speed is required as a vehicle speed is increased from the state of the first forward speed, the synchronization-connection of the second input shaft IS2 and third input shaft IS3 is released through the sleeve SLE4 of the fourth synchronizer SL4 and simultaneously the operation of the second clutch CL2 is released from the state of the first forward speed.

In addition, the operation of the second clutch CL2 is controlled again after the second speed shift gear D2 is connected to be in synchronization with the second output shaft OS2 through the second sleeve SLE2 of the second synchronizer SL2.

Thus, the rotational power of the engine (ENG) is naturally transmitted to the final reduction gear (FG) via the second clutch CL2, the second input shaft IS2, the second input gear G2, the second speed shift gear D2, the second output shaft OS2, and the second output gear OG2 such that the vehicle driving by the second forward speed is realized.

[Third Forward Speed]

When shifting to the third forward speed is required as a vehicle speed is increased from the state of the second forward speed, the second sleeve SLE2 of the second synchronizer SL2 is controlled to the neutral state by releasing the operation of the second clutch CL2 from the state of the second forward speed, and then the operation of the fourth synchronizer SL4 and the second clutch CL2 are sequentially controlled after the third speed shift gear D3 is connected to be in synchronization with the second output shaft OS2 through the third sleeve SLE3 of the third synchronizer SL3.

Thus, the rotational power of the engine (ENG) is transmitted to the final reduction gear (FG) via the second clutch CL2, the second input shaft IS2, the fourth synchronizer SL4, the third input shaft IS3, the fourth input gear G4, the third speed shift gear D3, the second output shaft OS2, and the second output gear OG2 such that the vehicle driving by the third forward speed is realized.

[Fourth Forward Speed]

When shifting to the fourth forward speed is required as a vehicle speed is increased from the state of the third forward speed, the connection of the second input shaft IS2 and the third input shaft IS3 is released through the sleeve SLE4 of the fourth synchronizer SL4, and simultaneously the operation of the second clutch CL2 is released from the state of the third forward speed.

In addition, the operation of the second clutch C3 is controlled again after the fourth speed shift gear D4 is connected with the first output shaft OS1 through the first sleeve SLE1 of the first synchronizer SL1.

Thus, the rotational power of the engine (ENG) is naturally transmitted to the final reduction gear (FG) via the second clutch CL2, the second input shaft IS2, the first input gear G1, the fourth speed shift gear D4, the first output shaft OS1, and the first output gear OG1 such that the vehicle driving by the fourth forward speed is realized.

Further, the third synchronizer SL3 is controlled to the neutral state after the above-described shifting is completed.

In a case that the power transmission apparatus according to various embodiments of the present invention performs the automated manual shifting, the preparatory shifting for sequentially increasing or decreasing the gear position is impossible because the second and third input shafts IS2 and IS3 simultaneously rotate while changing speed to the odd-numbered forward speed.

Meanwhile, in the above-described fixed gear ratio mode, the selective operations of the first clutch CL1 and the fourth synchronizer SL4 are controlled such that the motor/generator (MG) is driven so as to assist an engine (ENG) torque during the vehicle driving by the first, second, third, and fourth forward speeds.

That is, as the state in which the fourth synchronizer SL4 is operated so as to connect the second input shaft IS2 to be in synchronization with the third input shaft IS3 is maintained in the first and third forward speeds which are the odd-numbered forward speeds, the planetary gear set (PG) is directly connected with the second input shaft IS2 by operating only the first clutch CL1, and it is possible for the power of the motor/generator (MG) to be transmitted to the third input shaft IS3 through the planetary gear set (PG) for assist by the motor.

On the other hand, as the first clutch CL1 is controlled to operate so as to directly connect the planetary gear set (PG) to the second input shaft IS2 in the state that the second input shaft IS2 is connected to be in synchronization with the third input shaft IS3 by operating the fourth synchronizer SL4 during the vehicle driving in the state of releasing the fourth synchronizer SL4 in the second and fourth forward speeds which are the even-numbered forward speeds, it is possible for the power of the motor/generator (MG) to be transmitted to the second input shaft IS2 through the planetary gear set (PG) for assist by the motor.

In addition, in the fixed gear ratio mode, the regenerative braking can be realized by selectively operating the fourth synchronizer SL4 and the fifth synchronizer SL5 during the vehicle driving by the first, second, third, and fourth forward speeds.

That is, although the state in which the fourth synchronizer SL4 is operated so as to connect the second input shaft IS2 to be in synchronization with the third input shaft IS3 is maintained in the first and third forward speeds which are the odd-numbered forward speeds, the regenerative braking is possible irrespective of the state as the rotor (RT) of the motor/generator (MG) is connected to be in synchronization with the third input shaft IS3 by operating only the fifth synchronizer SL5 such that torque is transmitted from the first or second output shaft OS1 or OS2 to the motor/generator (MG) through the third input shaft IS3.

On the other hand, if the fifth synchronizer SL5 is controlled to operate so as to connect the rotor (RT) of the motor/generator (MG) to be in synchronization with the third input shaft IS3 in the state that the second input shaft IS2 is connected to be in synchronization with the third input shaft IS3 by operating the fourth synchronizer SL4 during the vehicle driving in the state of releasing the fourth synchronizer SL4 in the second and fourth forward speeds which are the even-numbered forward speeds, the regenerative braking is possible as torque is transmitted from the first or second output shaft OS1 or OS2 to the motor/generator (MG) through the second input shaft IS2 and the third input shaft IS3.

Hereinafter, HEV first, second, third, and fourth speeds of the variable gear ratio mode, which can realize electronic continuously variable transmission (e-CVT) by the planetary gear set (PG) according to operation-controlling the first clutch CL1, as the driving state by the simultaneous drive of the engine (ENG) and the motor/generator (MG), will be described.

[HEV First Speed]

In the HEV first speed, the first clutch CL1 is controlled to operate after the first speed shift gear D1 is connected with the first output shaft OS1 through the first sleeve SLE1 of the first synchronizer SL1, and the motor/generator (MG) is driven.

Thus, the rotational power of the engine (ENG) is input to the ring gear (R) of the planetary gear set (PG) and the rotational power of the motor/generator (MG) is input to the sun gear (S) of the planetary gear set (PG) such that the rotational power of the engine (ENG) and the motor/generator (MG) are transmitted to the third input shaft IS3 through the planetary carrier (PC) according to difference of torque.

In addition, a rotating speed of the rotational power of the third input shaft IS3 is changed according to gear ratio between the third input gear G3 and the first speed shift gear D1, and the rotational power of the third input shaft IS3 is transmitted to the final reduction gear (FG) through the first output shaft OS1 and the first output gear OG1 such that driving according to the HEV first speed is realized.

[HEV Second Speed]

When shifting to the HEV second speed is required as a vehicle speed is increased from the state of the HEV first speed, the operation of the first clutch C1 is released from the state of the HEV first speed, and then the first synchronizer SL1 is controlled to the neutral state and the second speed shift gear D2 is connected to be in synchronization with the second output shaft OS2 through the second sleeve SLE2 of the second synchronizer SL2, and then the first clutch C1 is operation-controlled again in the state that the fourth synchronizer SL4 is operation-controlled so as to connect the second input shaft IS2 to be in synchronization with the third input shaft IS3.

Thus, the rotational power of the engine (ENG) is input to the ring gear (R) of the planetary gear set (PG) and the rotational power of the motor/generator (MG) is input to the sun gear (S) of the planetary gear set (PG) such that the rotational power of the engine (ENG) and the motor/generator (MG) are transmitted to the third input shaft IS3, the fourth synchronizer SL4, and the second input shaft IS2 through the planetary carrier (PC) according to a difference of torque.

In addition, a rotating speed of the rotational power of the second input shaft IS2 is changed according to a gear ratio between the second input gear G2 and the second speed shift gear D2, and the rotational power of the second input shaft IS2 is transmitted to the final reduction gear (FG) through the second output shaft OS2 and the second output gear OG2 such that driving according to the HEV second speed is realized.

[HEV Third Speed]

When shifting to the HEV third speed is required as a vehicle speed is increased from the state of the HEV second speed, the second synchronizer SL2 is controlled to the neutral state after the operation of the fourth synchronizer SL4 and the first clutch C1 is released from the state of the HEV second speed, and the first clutch C1 is operation-controlled again after the third speed shift gear D3 is connected to be in synchronization with the second output shaft OS2 through the third sleeve SLE2 of the third synchronizer SL3.

Thus, the rotational power of the engine (ENG) is input to the ring gear (R) of the planetary gear set (PG) and the rotational power of the motor/generator (MG) is input to the sun gear (S) of the planetary gear set (PG) such that the rotational power of the engine (ENG) and the motor/generator (MG) are transmitted to the third input shaft IS3 through the planetary carrier (PC) according to a difference of torque.

In addition, a rotating speed of the rotational power of the third input shaft IS3 is changed according to gear ratio between the fourth input gear G4 and the third speed shift gear D3, and the rotational power of the third input shaft IS3 is transmitted to the final reduction gear (FG) through the second output shaft OS2 and the second output gear OG2 such that driving according to the HEV third speed is realized.

[HEV Fourth Speed]

When shifting to the HEV fourth speed is required as a vehicle speed is increased from the state of the HEV third speed, the third synchronizer SL3 is controlled to the neutral state after the operation of the first clutch C1 is released from the state of the HEV third speed, and the first clutch C1 is operation-controlled again in the state that the fourth synchronizer SL4 is operation-controlled so as to connect the second input shaft IS2 to be in synchronization with the third input shaft IS3 after the fourth speed shift gear D4 is connected to be in synchronization with the first output shaft OS1 through the first sleeve SLE1 of the first synchronizer SL1.

Thus, the rotational power of the engine (ENG) is input to the ring gear (R) of the planetary gear set (PG) and the rotational power of the motor/generator (MG) is input to the sun gear (S) of the planetary gear set (PG) such that the rotational power of the engine (ENG) and the motor/generator (MG) are transmitted to the third input shaft IS3, the fourth synchronizer SL4, and the second input shaft IS2 through the planetary carrier (PC) according to a difference of torque.

In addition, a rotating speed of the rotational power of the second input shaft IS2 is changed according to gear ratio between the first input gear G1 and the fourth speed shift gear D4, and the rotational power of the second input shaft IS2 is transmitted to the final reduction gear (FG) through the first output shaft OS1 and the first output gear OG1 such that driving according to the HEV fourth speed is realized.

Hereinafter, EV first, second, third, fourth, and reverse speeds of the fixed gear ratio mode which can perform the EV driving and the regenerative braking by the power of only the motor/generator (MG) in the state that the engine (ENG) is stopped while driving the motor/generator (MG) will be described.

[EV First Speed]

In the EV first speed, the fifth synchronizer SL5 is operation-controlled after the first speed shift gear D1 is connected with the first output shaft OS1 through the first sleeve SLE1 of the first synchronizer SL1.

Thus, the planetary gear set (PG) is directly connected with the third input shaft IS3 and driving torque of the motor/generator (MG) is transmitted to the final reduction gear (FG) via the third input shaft IS3, the third input gear G3, the first speed shift gear D1, the first output shaft OS1, and the first output gear OG1 such that driving according to the EV first speed is realized.

[EV Second Speed]

When shifting to the EV second speed is required as a vehicle speed is increased from the state of the EV first speed, the first synchronizer SL1 is controlled to the neutral state in the state of releasing the operation of the fifth synchronizer SL5 from the state of the EV first speed, and then the second speed shift gear D2 is connected to be in synchronization with the second output shaft OS2 through the second sleeve SLE2 of the second synchronizer SL2, and then the fourth synchronizer SL4 is operation-controlled after the fifth synchronizer SL5 is operation-controlled again.

Thus, the rotational power of the third input shaft IS3 is transmitted to the final reduction gear (FG) through the fourth synchronizer SL4, the second input shaft IS2, the second input gear G2, the second speed shift gear D2, the second output shaft OS2, and the second output gear OG2 such that driving according to the EV second speed is realized.

[EV Third Speed]

When shifting to the EV third speed is required as a vehicle speed is increased from the state of the EV second speed, the second synchronizer SL2 is controlled to the neutral state in the state of releasing the fourth and fifth synchronizers SL4 and SL5 from the state of the EV second speed, and then the operation of the fifth synchronizer SL5 is operation-controlled again after the third speed shift gear D3 is connected to be in synchronization with the second output shaft OS3 through the third sleeve SLE3 of the third synchronizer SL3.

Thus, the rotational power of the third input shaft IS3 is transmitted to the final reduction gear (FG) via the fourth input gear G4, the third speed shift gear D3, the second output shaft OS2, and the second output gear OG2 such that driving according to the EV third speed is realized.

[EV Fourth Speed]

When shifting to the EV fourth speed is required as a vehicle speed is increased from the state of the EV third speed, the third synchronizer SL3 is controlled to the neutral state in the state of releasing the fifth synchronizer SL5 from the state of the EV third speed, and then the fifth synchronizer SL5 is operation-controlled again, and simultaneously, the fourth synchronizer SL4 is operation-controlled after the fourth speed shift gear D1 is connected to be in synchronization with the first output shaft OS1 through the first sleeve SLE1 of the first synchronizer SL1.

Thus, the rotational power of the third input shaft IS3 is transmitted to the final reduction gear (FG) via the fourth synchronizer SL4, the second input shaft IS2, the first input gear G1, the fourth speed shift gear D4, the first output shaft OS1, and the first output gear OG1 such that driving according to the EV fourth speed is realized.

[EV Reverse Speed]

The EV reverse speed is realized by driving the motor/generator (MG) in reverse rotation in the state to be same as the EV first speed in which the fifth synchronizer SL5 is operation-controlled after the first speed shift gear D1 is connected with the first output shaft OS1 through the first sleeve SLE1 of the first synchronizer SL1.

Thus, the planetary gear set (PG) is directly connected with the third input shaft IS3 and driving torque of the motor/generator (MG) reverse rotation is transmitted to the final reduction gear (FG) via the third input shaft IS3, the third input gear G3, the first speed shift gear D1, the first output shaft OS1, and the first output gear OG1 such that driving according to the EV reverse speed is realized.

Meanwhile, a power transmission apparatus according to various embodiments of the present invention for realizing the above-described shift mode is configured so that the output side of the engine (ENG) is connected with the planetary carrier (PC) of the planetary gear set (PG) such that the planetary gear set (PG) is directly connected with the engine (ENG) for converting from the variable gear ratio mode by simultaneously driving the engine (ENG) and the motor/generator (MG) to drive the fixed gear ratio mode by driving the engine (ENG). At this time, as the fourth synchronizer SL4 is preferentially operation-controlled and a slip speed of the second clutch CL2 is minimized by controlling the motor, and simultaneously, the second clutch CL2 having high heat capacity in comparison with the synchronizer is coupled for power-connecting the output side of the engine (ENG) with the second and third input shafts IS2 and IS3, the conversion from the variable gear ratio mode to the fixed gear ratio mode can be smoothly performed.

In addition, ordinary constituent elements may be used for directly connecting the planetary gear set (PG) with the engine (ENG) without an additional control element. Further, it is possible for the mode conversion to be smoothly performed without cutting power because the mode conversion is performed in the state that the rotational power of the engine (ENG) is transmitted through the first clutch CL1.

Concretely, in the state that the first speed shift gear D1 is connected to be in synchronization with the first output shaft OS1 by the operation of the first synchronizer SL1, the rotational power of the engine (ENG) being input to the ring gear (R) of the planetary gear set (PG) through the first input shaft IS1 and the rotational power of the motor/generator (MG) being input to the sun gear (S) are combined by operation-controlling the first clutch CL1, and the rotational power varying the speed ratio through the planetary carrier (PC) is transmitted to the third input shaft IS3 such that driving according to the variable gear ratio mode of the HEV first speed is realized.

The mode conversion from driving according to the variable gear ratio mode of the HEV first speed to the fixed gear ratio mode of the first forward speed is performed as the operation of the first clutch CL1 is maintained, and simultaneously, the second clutch CL2 is operated so as to directly connect the planetary gear set (PG) with the engine (ENG) after the third input shaft IS3 directly connected with the planetary carrier (PC) of the planetary gear set (PG) is connected to be in synchronization with the second input shaft IS2 through the fourth synchronizer SL4 such that the rotational power is just transmitted to the second and third input shafts IS2 and IS3.

At this time, the operation of the first clutch CL1 may be maintained, and simultaneously, assist by the motor may be maintained. The rotational of the engine (ENG) is just transmitted to the third input shaft IS3 by the operation of the second clutch CL2 even while operation-controlling the second input shaft IS2 and the fourth synchronizer SL4 although the state of directly connecting the planetary gear set (PG) is released if the first clutch CL1 is released.

Herein, the engine and the motor are controlled for operation-controlling the second clutch CL2. The control of the engine and the motor is a control for the rotation speed of the engine (ENG), the motor/generator (MG), and the second input shaft IS2 to be in synchronization with each other. The rotation speed of the engine (ENG) will be called 'We', the rotation speed of the second input shaft IS2 will be called 'Wip', and the rotation speed difference between the engine (ENG) and the second input shaft IS2 will be called 'ΔW' (We−Wip). The second clutch CL2 is operation-controlled when the rotation speed difference (ΔW) is smaller than a rotation speed difference (ΔWc) being able to combine the second clutch CL2 (ΔW<ΔWc).

According to various embodiments of the present invention, the fixed gear ratio mode (DCT mode) in which power delivery efficiency is excellent and the variable gear ratio mode (e-CVT mode) in which consumption efficiency is excellent as an optimal operation point control is possible through the planetary gear set (PG) are combined. Therefore, a drawback according to the structure in which the direct connection of the planetary gear set (PG) is realized by controlling only the synchronizer SL4 connecting the second and third input shafts IS2 and IS3 to be in synchronization with each other when the mode conversion is performed can be solved and performance of the smooth mode conversion can be ensured as the clutch CL2 for DCT mode conversion is operated together with the synchronizer SL4 such that inertia and vibration of the engine are absorbed to the clutch CL2.

In addition, a power transmission apparatus for a vehicle according to various embodiments of the present invention realizes four forward speeds by the rotational power of the engine (ENG), four forward speeds of the HEV mode by the rotational power of the engine (ENG) and the motor/generator (MG), and four forward speeds of the EV mode by the rotational power of the motor/generator (MG). Therefore, fuel consumption may be improved.

Further, smooth startup may be performed without slip of friction members by the engine (ENG) and the motor/generator (MG) which are connected with each of rotation elements of the planetary gear set (PG), and smooth startup may be performed as startup is performed by only the motor/generator (MG) in the state that the power of the engine (ENG) is blocked.

In addition, as slip of the clutch which is a friction member is not generated in startup, durability of the friction member may be improved, energy loss may be minimized, and fuel consumption may be better.

Acceleration performance can also be improved as the motor/generator (MG) may be used as sub-power when the vehicle is driven by the rotational power of the engine (ENG).

In addition, the vehicle can be safely driven and shifted like an ordinary double clutch transmission when the motor/generator (MG) is broken.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a vehicle, comprising:
   a first input shaft selectively connected to an output side of an internal combustion engine through a first clutch;
   a second input shaft disposed at the first input shaft without any rotational interference and selectively connected to the output side of the internal combustion engine through a second clutch;
   a motor/generator performing a function of a motor and a generator; and
   a planetary gear set including first, second, and third rotation elements such that the first rotation element is directly connected with the motor/generator, the second rotation element is selectively connected with the second input shaft so as to be in synchronization with each other, and the third rotation element is directly connected with the first input shaft,
   wherein a variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element, and
   a fixed gear ratio mode adapted to transmit rotational power of the internal combustion engine through the second input shaft while connecting the planetary gear set with the second input shaft by operating the second clutch, after the second rotation element is connected with the second input shaft so as to be in synchronization with each other while maintaining the operation state of the first clutch in the variable gear ratio mode, are realized.

2. The power transmission apparatus of claim 1, further comprising
   a third input shaft disposed in parallel with the second input shaft on the first input shaft without inter-rotational interference so as to be selectively connected to be in synchronization with the second input shaft by one synchronizer, to be selectively connected to be in synchronization with the first rotation element by another synchronizer, and to be directly connected with the second rotation element.

3. The power transmission apparatus of claim 2, wherein a plurality of input gears are disposed on the second and third input shafts, the power transmission apparatus further comprising:
   a first shift output mechanism changing a rotating speed of rotational power being input from the input gear on the second and third input shaft and outputting the changed rotating speed; and
   a second shift output mechanism changing a rotating speed of rotational power being input from the input gear on the second and third input shafts and outputting the changed rotating speed.

4. The power transmission apparatus of claim 3, wherein the input gear to influence even-numbered shifting gear positions is disposed at the second input shaft, and the input gear to influence odd-numbered shifting gear positions is disposed at the third input shaft.

5. The power transmission apparatus of claim 3, wherein
   a first input gear for realizing a fourth speed and a second input gear for realizing a second speed are sequentially disposed from a front side to a rear side on the second input shaft, and
   a third input gear for realizing a first speed and a fourth input gear for realizing a third speed are sequentially disposed from a front side to a rear side on the third input shaft.

6. The power transmission apparatus of claim 5, wherein the first shift output mechanism comprises:
   a first output shaft disposed in parallel with the second and third input shafts;
   a first output gear fixed to and disposed at one end of the first output shaft so as to output rotational power of the first output shaft;
   a first speed shift gear disposed on the first output shaft so as to be externally engaged with the third input gear;
   a fourth speed shift gear disposed on the first output shaft so as to be externally engaged with the first input gear; and
   a first synchronizer selectively connecting the first speed shift gear or fourth speed shift gear to be in synchronization with the first output shaft.

7. The power transmission apparatus of claim 5, wherein the second shift output mechanism comprises:
   a second output shaft disposed in parallel with the second and third input shafts;
   a second output gear fixed to and disposed at one end of the second output shaft so as to output rotational power of the second output shaft;
   a second speed shift gear disposed on the second output shaft so as to be externally engaged with the second input gear;
   a third speed shift gear disposed on the second output shaft so as to be externally engaged with the fourth input gear;
   a second synchronizer selectively connecting the second speed shift gear to be in synchronization with the second output shaft; and
   a third synchronizer connecting the third speed shift gear to be in synchronization with the second output shaft.

8. The power transmission apparatus of claim 2, wherein the one synchronizer comprises a fourth synchronizer which selectively connects the third input shaft and the second input shaft to be in synchronization with each other, and the other synchronizer comprises a fifth synchronizer which selectively connects the third input shaft and the first rotation element to be in synchronization with each other.

9. A power transmission apparatus for a vehicle comprising:
   a first input shaft selectively connected to an output side of an internal combustion engine through a first clutch;
   a second input shaft disposed at the first input shaft without any rotational interference and selectively connected to the output side of the internal combustion engine through a second clutch;
   a third input shaft disposed in parallel with the second input shaft on the first input shaft without inter-rotational interference so as to be selectively connected to be in synchronization with the second input shaft by one synchronizer and to be directly connected with the second rotation element;
   a motor/generator disposed on the third input shaft so as to function as a motor and a generator; and
   a planetary gear set including first, second, and third rotation elements such that the first rotation element is directly connected with the motor/generator, the second rotation element is directly connected with the third input shaft, and the third rotation element is directly connected with the first input shaft,
wherein a variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element to the third input shaft, and
a fixed gear ratio mode adapted to transmit rotational power of the internal combustion engine to the second and third input shafts while connecting the planetary gear set with the second input shaft by operating the second clutch, after the third input shaft directly connected with the second rotation element is connected with the second input shaft to be in synchronization by the one synchronizer while maintaining the operation state of the first clutch in the variable gear ratio mode, are realized.

10. The power transmission apparatus of claim 9, wherein the third input shaft is selectively connected to be in synchronization with the first rotation element by another synchronizer.

11. The power transmission apparatus of claim 10, wherein the one synchronizer comprises a fourth synchronizer selectively connecting the third input shaft and the second input shaft with each other and the other synchronizer comprises a fifth synchronizer selectively connecting the third input shaft and the first rotation element with each other.

12. The power transmission apparatus of claim 9, wherein a first input gear for realizing a fourth speed and a second input gear for realizing a second speed are sequentially disposed from a front side to a rear side on the second input shaft, and a third input gear for realizing a first speed and a fourth input gear for realizing a third speed are sequentially disposed from a front side to a rear side on the third input shaft, the power transmission apparatus further comprising:
a first shift output mechanism changing a rotating speed of rotational power being input from the input gear on the second and third input shafts and outputting the changed rotating speed; and
a second shift output mechanism changing a rotating speed of rotational power being input from the input gear on the second and third input shafts and outputting the changed rotating speed.

13. The power transmission apparatus of claim 12, wherein the first shift output mechanism comprises:
a first output shaft disposed in parallel with the second and third input shafts;
a first output gear fixed to and disposed at one end of the first output shaft so as to output rotational power of the first output shaft;
a first speed shift gear disposed on the first output shaft so as to be externally engaged with the third input gear;
a fourth speed shift gear disposed on the first output shaft so as to be externally engaged with the first input gear; and
a first synchronizer selectively connecting the first speed shift gear or fourth speed shift gear to be in synchronization with the first output shaft.

14. The power transmission apparatus of claim 12, wherein the second shift output mechanism comprises:

a second output shaft disposed in parallel with the second and third input shafts;
a second output gear fixed to and disposed at one end of the second output shaft so as to output rotational power of the second output shaft;
a second speed shift gear disposed on the second output shaft so as to be externally engaged with the second input gear;
a third speed shift gear disposed on the second output shaft so as to be externally engaged with the fourth input gear;
a second synchronizer selectively connecting the second speed shift gear to be in synchronization with the second output shaft; and
a third synchronizer connecting the third speed shift gear to be in synchronization with the second output shaft.

15. A power transmission apparatus for a vehicle, comprising:
a first input shaft selectively connected to an output side of an internal combustion engine;
a second input shaft formed as a hollow shaft and disposed at a front side of the first input shaft without any rotational interference so as to be selectively connected to the output side of the internal combustion engine such that a plurality of input gears having a different number of gear teeth are disposed on an exterior circumference thereof;
a third input shaft formed as a hollow shaft and disposed at a rear side of the second input shaft on the first input shaft without any rotational interference so as to be selectively connected to be in synchronization with the second input shaft such that a plurality of input gears having the different number of gear teeth are disposed on an exterior circumference thereof;
a motor/generator including a stator which is disposed on a rear side of the third input shaft and is fixed to a transmission housing and a rotor which is rotatably supported therein along a radial direction of the stator;
a planetary gear set disposed on an external circumference of a rear side of the third input shaft such that a first rotation element thereof is directly connected with the rotor of the motor/generator, a second rotation element thereof is directly connected with a rear end of the third input shaft, and a third rotation element thereof is directly connected with the first input shaft;
a first clutch selectively connecting the output side of the internal combustion engine with the first input shaft;
a second clutch selectively connecting the output side of the internal combustion engine with the second input shaft;
one synchronizer selectively connecting the second input shaft and third input shaft to be in synchronization with each other;
another synchronizer selectively connecting the first rotation element and the third input shaft to be in synchronization with each other;
a first shift output mechanism changing a rotating speed of rotational power being input from the input gear of the second and third input shafts so as to realize two shifting gear positions for forward speed and then outputting the changed rotational power; and
a second shift output mechanism changing a rotating speed of rotational power being input from the input gear of the second and third input shafts so as to realize two shifting gear positions and then outputting the changed rotational power.

16. The power transmission apparatus of claim 15, wherein a variable gear ratio mode adapted to vary a speed ratio by combining rotational power of the internal combustion engine which is input to the third rotation element through the first input shaft by operation of the first clutch and rotational power of the motor/generator which is input to the first rotation element and to transmit rotational power according to the varied speed ratio through the second rotation element to the third input shaft, and a fixed gear ratio mode adapted to just transmit rotational power of the internal combustion engine to the second and third input shafts while connecting the planetary gear set with the second input shaft by operating the second clutch, after the third input shaft directly connected with the second rotation element is connected with the second input shaft to be in synchronization by the one synchronizer while maintaining the operation state of the first clutch in the variable gear ratio mode, are realized.

17. The power transmission apparatus of claim 15, wherein the one synchronizer comprises a fourth synchronizer which selectively connects the third input shaft and the second input shaft to be in synchronization with each other, and the other synchronizer comprises a fifth synchronizer which selectively connects the third input shaft and the first rotation element to be in synchronization with each other.

18. The power transmission apparatus of claim 15, wherein a first input gear for realizing a fourth speed and a second input gear for realizing a second speed are sequentially disposed from a front side to a rear side on the second input shaft, and a third input gear for realizing a first speed and a fourth input gear for realizing a third speed are sequentially disposed from a front side to a rear side on the third input shaft.

19. The power transmission apparatus of claim 18, wherein the first shift output mechanism comprises:
 a first output shaft disposed in parallel with the second and third input shafts;
 a first output gear fixed to and disposed at one end of the first output shaft so as to output rotational power of the first output shaft;
 a first speed shift gear disposed on the first output shaft so as to be externally engaged with the third input gear;
 a fourth speed shift gear disposed on the first output shaft so as to be externally engaged with the first input gear; and
 a first synchronizer selectively connecting the first speed shift gear or fourth speed shift gear to be in synchronization with the first output shaft.

20. The power transmission apparatus of claim 18, wherein the second shift output mechanism comprises:
 a second output shaft disposed in parallel with the second and third input shafts;
 a second output gear fixed to and disposed at one end of the second output shaft so as to output rotational power of the second output shaft;
 a second speed shift gear disposed on the second output shaft so as to be externally engaged with the second input gear;
 a third speed shift gear disposed on the second output shaft so as to be externally engaged with the fourth input gear;
 a second synchronizer selectively connecting the second speed shift gear to be in synchronization with the second output shaft; and
 a third synchronizer connecting the third speed shift gear to be in synchronization with the second output shaft.

\* \* \* \* \*